(12) United States Patent
Kitchin

(10) Patent No.: US 7,366,471 B1
(45) Date of Patent: Apr. 29, 2008

(54) MITIGATING INTERFERENCE BETWEEN WIRELESS SYSTEMS

(75) Inventor: Duncan M. Kitchin, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/652,697

(22) Filed: Aug. 31, 2000

(51) Int. Cl.
*H04B 1/00* (2006.01)
(52) U.S. Cl. ............... 455/63.1; 455/41.2; 455/67.13
(58) Field of Classification Search ............ 455/63.1, 455/63.2, 63.3, 67.11, 67.13, 67.15, 41.2, 455/41.3
See application file for complete search history.

(56) References Cited

U.S. PATENT DOCUMENTS

| | | | |
|---|---|---|---|
| 5,448,754 A | | 9/1995 | Ho et al. |
| 5,574,979 A | * | 11/1996 | West ........................ 455/63 |
| 5,603,093 A | * | 2/1997 | Yoshimi et al. ............ 455/63 |
| 5,649,303 A | | 7/1997 | Hess et al. |
| 5,696,903 A | | 12/1997 | Mahany |
| 6,374,082 B1 | * | 4/2002 | Carlson ..................... 455/63.1 |
| 6,704,346 B1 | * | 3/2004 | Mansfield .................. 375/136 |

FOREIGN PATENT DOCUMENTS

WO    WO 96/27246    9/1996

OTHER PUBLICATIONS

Jaap C. Haartsen et al., *The Bluetooth Radio System*, IEEE Communications Society, US, vol. 7, No. 1, Feb. 2000, pp. 28-36.
Jaap Haartsen, *Bluetooth—The universal radio interface for ad hoc, wireless connectivity*, ON—Erricsson Review, Ericsson, Stockholm, SE, No. 3, 1998, pp. 110-117.

* cited by examiner

*Primary Examiner*—Lee Nguyen
(74) *Attorney, Agent, or Firm*—Trop, Pruner & Hu, P.C.

(57) ABSTRACT

Two separate radio frequency networks may be operated within interference distance from one another in a way which mitigates the possibility of interference. Using received signal strength indicator data, the nature of the interference may be determined without actually demodulating the interfering signal. The timing of the interfering signal and its characteristic features may be determined. Using that information, together with the probability that any given slot will actually be occupied by an interfering transmission, a statistics package may be developed which gives an indication of the probability of a transmission from the interferer at any given time. That package may be transmitted to other nodes in the same network. When a first node wishes to transmit information to a second node, the first node may analyze the statistics package received from the second node. The first node may thereby make a determination about when to actually initiate the transmission to the second node.

25 Claims, 7 Drawing Sheets

MITIGATING INTERFERENCE BETWEEN WIRELESS SYSTEMS

BACKGROUND

This invention relates generally to wireless systems including wireless local area network devices.

Packet-based wireless local area network (LAN) devices enable a plurality of clients to be coupled together with a server without the need for extensive wiring. The IEEE 802.11 family of standards (IEEE Standard 802.11 available from the Institute of Electrical and Electronics Engineers, New York, N.Y.) describes a standard for wireless LAN systems. It involves the use of either 2.4 GHz Industrial, Scientific and Medical (ISM) or 5 GHz communication frequency bands. These bands are minimally regulated and, as a result, other interfering wireless devices (that do not comply with the IEEE 802.11 standard) may be transmitting in the same area in the same band.

As an example, within a given office that is utilizing a system compliant with the IEEE 802.11 standard, other individuals may utilize devices compliance with the Bluetooth specification (V.1.0, Dec. 1, 1999) for wireless devices. Like the IEEE 802.11 standard, the Bluetooth devices also operate in the 2.4 GHz ISM band.

Interference may result between the Bluetooth and packet-based wireless LAN devices. Generally, in the case of Bluetooth devices, their power output is relatively small relative to the wireless LAN devices. However, a proximate Bluetooth device may adversely affect and interfere with the reception of a local wireless LAN device. Another device in the LAN may transmit to a local LAN device proximate a Bluetooth transmitter. The remote LAN transmitter may have no idea that a lower power Bluetooth transmitter may also be transmitting. As a result, interference may occur which varies depending on the receiver that is receiving the signal.

Proposals for mitigating the effects of interference between Bluetooth and packet-based wireless LANs operating in the same frequency band generally have relied upon frequency orthogonality. However, such techniques may be ineffective when the Bluetooth and wireless LAN devices are in close proximity which, of course, is when the interference is most substantial.

Thus, there is a need for a way to mitigate interference between wireless devices operating on different standards within the same frequency band. In addition, there is a need for a system that accommodates for the problems that arise when various devices in a wireless network are not aware that receivers in that network may be proximate to non-compliant transmitters operating within the same frequency band.

DETAILED DESCRIPTION

Figure 1:
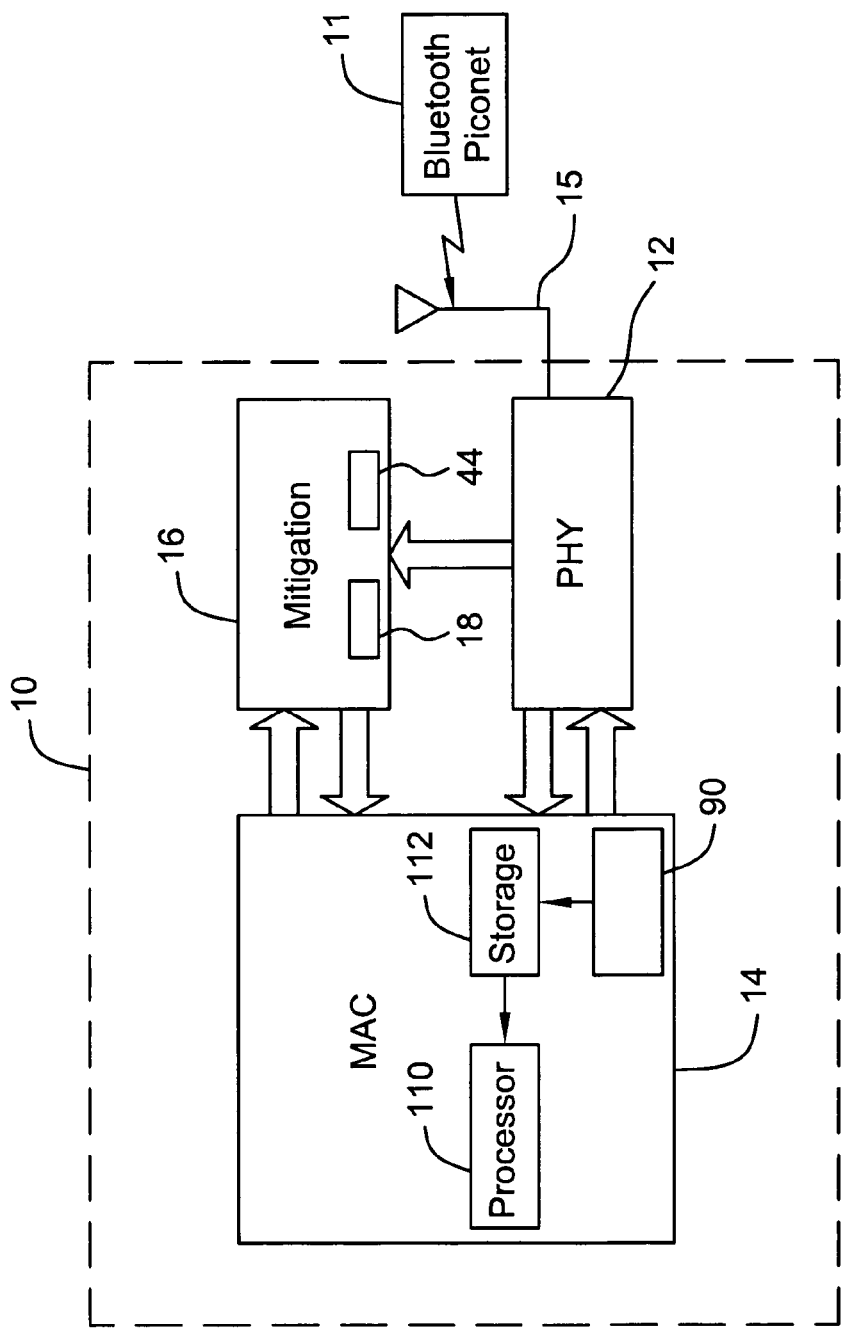
FIG. 1 is a schematic depiction of one embodiment of the present invention.

Referring to FIG. 1, a node 10 in a wireless local area network (LAN) may be positioned proximate to a Bluetooth piconet 11. The Bluetooth piconet 11 may operate in accordance with the Bluetooth specification. The wireless LAN node 10 may operate in accordance with one of the wireless LAN standards such as the IEEE 802.11 standard. The node 10 and the piconet 11 may operate in the same frequency band such as the 2.4 GHz Industrial, Scientific and Medical (ISM) band which is minimally regulated. The node 10 includes a mitigation module 16 that is responsible for mitigating potential interference between the Bluetooth piconet 11 (which is not part of the wireless LAN that includes the node 10) and the node 10 itself.

The wireless LAN node 10 also includes a physical layer 12 such as a modulator/demodulator or modem and a medium access control unit (MAC) 14. The physical layer may receive a received signal strength indication (RSSI) signal from the physical layer 12. The RSSI signal is conventionally utilized in association with what is known as a channel access control.

The raw RSSI data, received from the physical layer 12, is also utilized by the mitigation module 16. The mitigation module 16 uses the RSSI data to detect transmission of any devices that are not part of the LAN, such as transmission from a Bluetooth piconet. The mitigation module 16 subsequently develops statistics about the operation of such Bluetooth piconets. The statistics may then be used to predict when any device in the Bluetooth piconet may be transmitting. This prediction information may then be utilized to modify the transmission time of a transmitter within the LAN to avoid transmitting when a potentially interfering Bluetooth piconet is more likely to also be transmitting.

While Bluetooth and 802.11 embodiments are described, the present invention is not limited to such examples. Embodiments may be implemented to avoid interference between wireless transmitters in a variety of circumstances.

The statistical data developed by the mitigation module 16 is provided to the MAC 14. The MAC 14 then provides that information to other LAN network transmitters wirelessly coupled to the node 10. In addition, the MAC 14 may use data received from other nodes in the LAN network to determine when to operate its own physical layer 12 in a transmission mode so as to reduce the likelihood of interfering with transmissions by Bluetooth piconets proximate to the internal wireless LAN receiver. Thus, the mitigation module 16 includes a statistics generating unit 18 and a collision probability estimator 44.

The Bluetooth specification compliant piconet 11 transmits data in regularly occurring bursts. These bursts may appear as relatively rectangular signal blocks that occur at regular intervals. Thus, in accordance with one embodiment of the present invention, when the node 10 is neither sending or receiving wireless LAN signals, it is assumed that any background noise received by the antenna 15 is the result of a Bluetooth transmission signal. A Bluetooth signal includes a telltale 625 microsecond repeat interval or pattern. Each 625 microsecond interval is called a "slot". The pattern of slot occupancy repeats with a period that is at most six slots and is always a factor of six. However, any given slot may or may not be occupied with a transmission depending on the particular protocol utilized by the proximate Bluetooth piconet 11.

The Bluetooth piconet 11 transmits in recurring slots starting from a synchronization reference point. That is, each 625 microsecond slot begins at a synchronization reference point. Information about the synchronization reference point, the slot occupancy probability, and the nature of the 625 microsecond transmission intervals may be collected over time. A probability may then be developed to determine the likelihood of interference between a transmission received by the node 10 and the noise received from the Bluetooth piconet 11.

In accordance with one embodiment of the present invention, it is not necessary to actually demodulate the RSSI data. This may be important in some embodiments because to do so may require that the node 10 include a Bluetooth compliant receiver. By identifying the Bluetooth signal and the background RSSI noise without demodulating the signal, sufficient information may be obtained, in some embodiments, about the nature of the proximate Bluetooth transmitter to decrease the likelihood of interference.

As mentioned above, not all of the slots of a Bluetooth transmission may be occupied. Different Bluetooth protocols (such as HV1) may occupy or use different ones of the recurring set of six slots. For example, the HV1 protocol transmits data in every other slot. Thus, that Bluetooth protocol sends bursts of data in alternating 625 microsecond intervals with a six slot repeat. In general, the empty slots occur in a regular pattern in each six slot sequence.

By following the sequence of six slots, even without initially knowing which slot is the first slot of the sequence, the node 10 can find the empty slots and can determine the periodicity of those empty slots.

The statistics generating unit 18 may sample the RSSI data received from the physical layer 12 at regular intervals. Since the slot is 625 microseconds in length, advantageously the sample rate of the unit 18 is integrally dividable into 625. One such advantageous sampling rate is 25 microseconds. This rate may be sufficiently fine to locate the start and stop of Bluetooth transmission within a given slot without unreasonably increasing the design requirements for the node 10.

Figure 2:
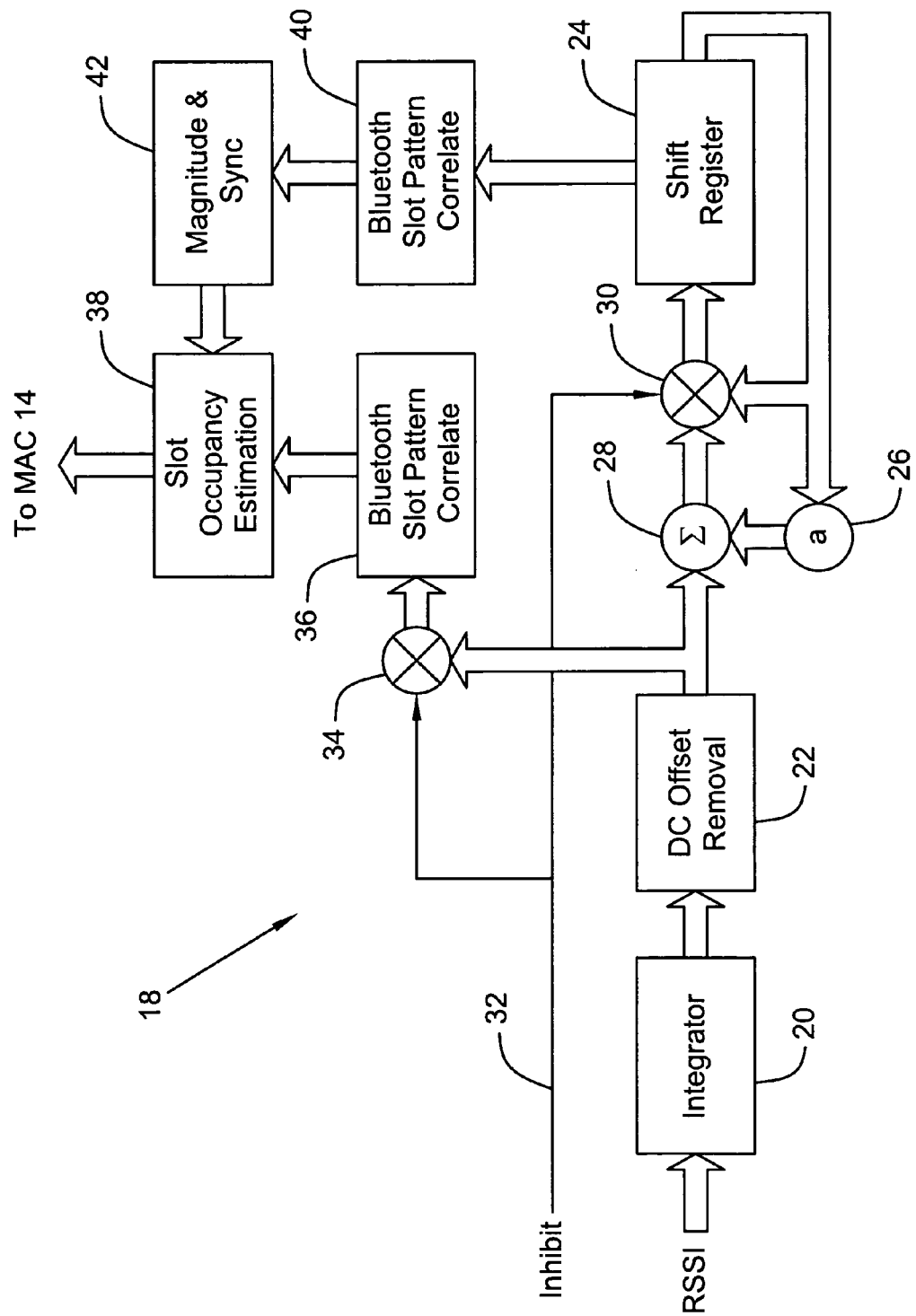
FIG. 2 is a block diagram of a portion of the mitigation module shown in FIG. 1 in accordance with one embodiment of the present invention.

The statistics generating unit 18, shown in FIG. 2, includes an inhibit line 32 coupled to the MAC 14. When the MAC 14 is operating the physical layer 12 to transmit or receive data, the inhibit line 32 terminates the generation of statistic packages. This inhibition avoids generating statistics packages when the data may be obscured by the ongoing receipt or transmission of wireless LAN data (not pursuant to the competing protocol such as the Bluetooth protocol). Therefore, the analysis may be simplified and the results may be improved in some embodiments, by inhibiting the statistics package generation during intervals when the node 10 itself is either transmitting or receiving.

A synchronization estimate is achieved using an integrator 20, an offset removal unit 22, a shift register 24, a Bluetooth slot pattern correlate 36 and a Bluetooth slot pattern correlate 40. The synchronization estimate is based on a known pattern that repeats with known periodicity. The integrator 20 integrates the RSSI data over each sample interval and develops an average level for the RSSI data. The DC offset removal unit 22 takes the average measurements and resolves them to zero over an extended time period. Thereby, the unit 22 removes any DC offset in the RSSI data.

The shift register 24 accumulates the integrated sample levels over a period of time. In one embodiment of the present invention, with a twenty-five microsecond sample rate, the shift register 24 may be capable of storing twenty-five samples and re-circulating those samples. That is, in order to analyze the 625 microsecond slot pattern, successive sets of twenty-five samples are stored one on top of the other in the twenty-five locations within the shift register 24. Periodically, data is shifted out of the shift register 24 to the Bluetooth slot pattern correlate 40.

The unit 18 likely begins its analysis at an indeterminate point within the sequence of slots transmitted by the Bluetooth piconet 11. That is, the unit 18 initially has no way to know whether the slot it first receives happens to be the first slot in a sequence of six slots generated by the piconet 11. The correlate 40 finds the start point of the sequence of six slots. When the correlate 40 sees a peak in the data received from the shift register 24, the correlate 40 knows where the Bluetooth transmission pattern starts. Thus, by progressively overlaying the data in the shift register 24 over a sufficient period of time, the start of the slot sequence may be identified based on the time location of the peak level.

The correlate 36 determines whether there is a transmission in a given slot. The correlate 40 finds where each 625 microsecond slot is, averaged over time.

When the inhibit line 32 is active, the shift register 24 simply recycles or re-circulates without new input data to maintain synchronization with its previous analyses. Thus, data is shifted from the shift register 24 to the accumulator 26 and then summed with new data in the summer 28 during non-inhibited operation. In inhibited operations, the data simply circulates back to the shift register 24 through the combiner 30 that has been operated by the inhibit line 32 signal to block new input data and to simply circulate the current data residing in the shift register 24.

The slot occupancy estimation unit 38 coordinates the start of each slot and determines, based on the data from the magnitude and synchronization unit 42 and the correlate 36, where the slot begins using the local time base. The magnitude and synchronization unit 42 determines if there is any Bluetooth transmitter that has been recognized based on the RSSI data and determines if there is a peak in the data from the Bluetooth slot pattern correlate 40. The magnitude and synchronization unit 42 tells the slot occupancy estimation unit 38 that a Bluetooth signal has been identified (or not) and provides a reference or start point for the first slot.

The estimation unit 38 then figures out if there is anything in each of the six slots. The output from the slot occupancy estimation unit 38 may be of the format shown at 60 in FIG. 5. It may in the form of high pulses 62 and low pulses 64 that provide estimated Bluetooth transmission probabilities at given times. This information is a compilation of the timing of the slots of the local Bluetooth piconet 11 and the slot occupancy probability. Thus, the pulse 62 indicates a higher probability of a Bluetooth transmission occurring while the pulse 64 indicates a lower probability.

The combination of data including a synchronization reference point and a slot occupancy probability estimation function may be represented as condensed data set with which to estimate the probability of a future time frequency collision with a detected Bluetooth piconet. For example, this data may be compacted into a single 32-bit word that constitutes the statistics package communicated to one or more other nodes in a wireless LAN network.

Figure 3:
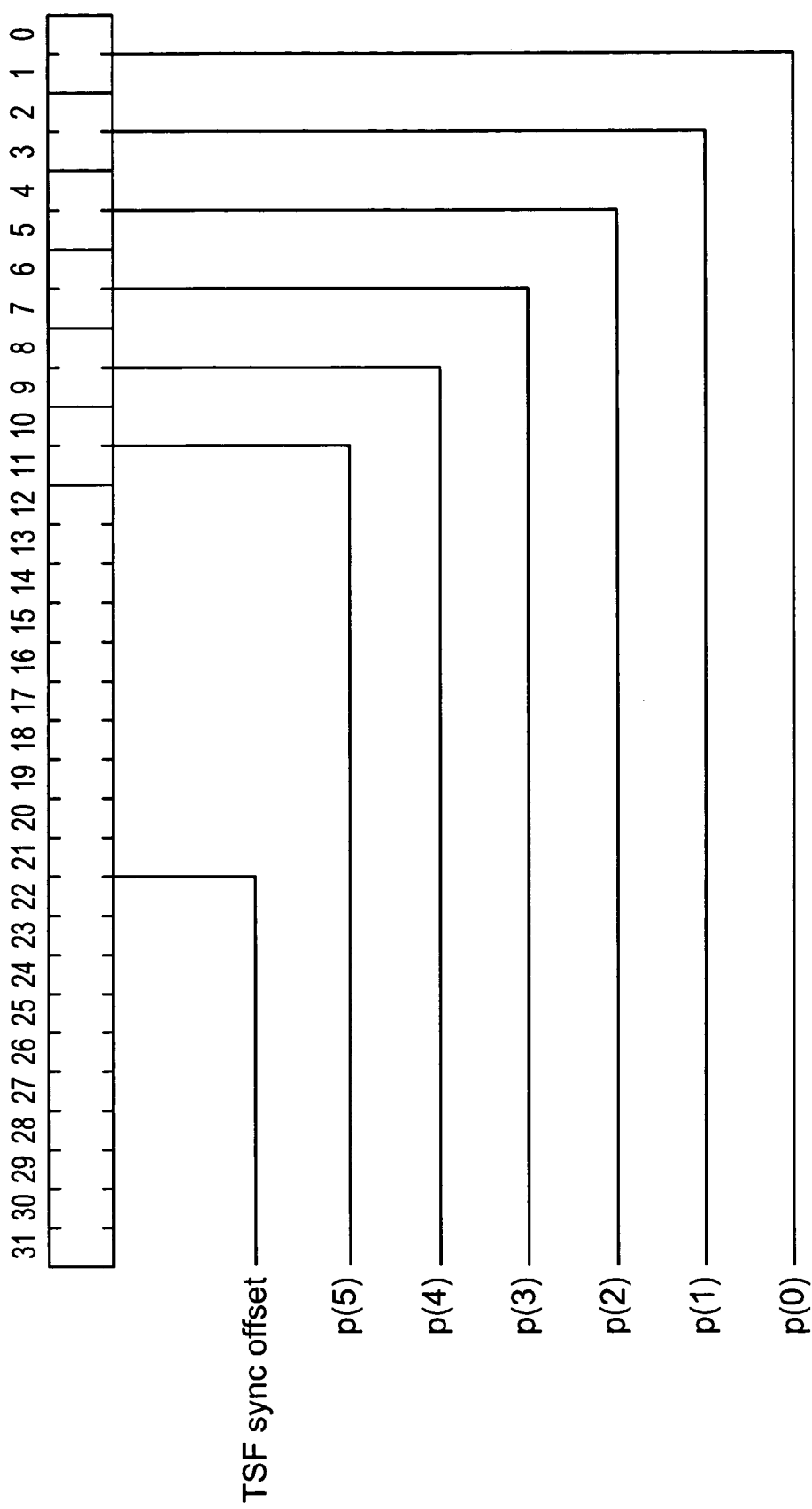
FIG. 3 is a depiction of a statistics package format utilized to transmit information between nodes in accordance with one embodiment of the present invention.

Referring to FIG. 3, the 32-bit word, in accordance with one embodiment of the present invention, may include a six tuple containing six probability estimates of two bits each, one for each Bluetooth slot. In addition, the 32-bit word may include a timing synchronization function (TSF) reference that provides time information that is correlated to the recognized time base within the wireless LAN network. The TSF data may, for example, be in accordance with the TSF standard set forth in the IEEE 802.11 specification. The TSF reference may be the least significant bits from a TSF timer, divided by twenty-five at the start of the first slot.

By providing the statistics package in a compact format, the statistics package may be readily and conveniently transmitted to all the nodes in a given network to advise them of the local conditions at each node. If each node transmits it own package during slack intervals, it is advantageous to provide the packages in a compact format to avoid any significant overall reduction of network bandwidth.

Each node 10 mitigation module 16 may also include a collision probability estimator 44 (FIG. 1). The estimator 44 receives the statistics package from a unit 38 of a node to which the node 10 intends to transmit data. Thus, in effect, the received statistics package provides information about the local interference conditions proximate to the intended recipient node.

Figure 5:
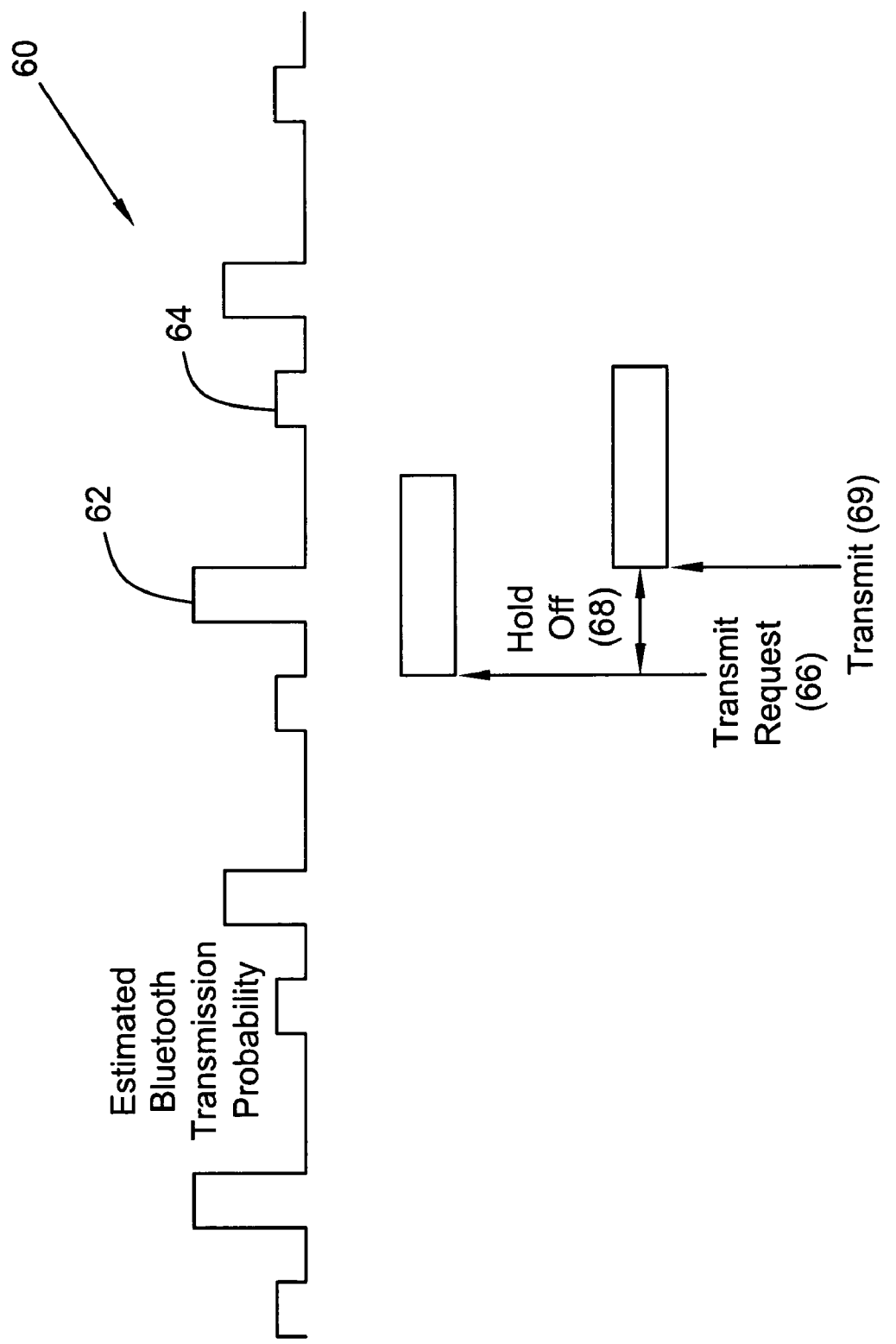
FIG. 5 shows a hypothetical statistics package waveform in accordance with one embodiment of the present invention and further illustrates how the statistics package may be utilized to determine when to transmit information to a receiver in accordance with one embodiment of the present invention.

The estimator 44 receives a transmit request 66, shown in FIG. 5. The estimator 44 compares the transmit request 66 to the statistics package 60. It initiates a transmit holdoff signal 68 that causes the transmission of the transmit request 66 to be shifted in time to a time when the probability of a collision is lower. Thus, if a request seeks a transmission at time 66 which would overlap with a higher probability pulse 62, the transmission may be held off so that at most it overlaps with a pulse 64 indicating a lower probability of an overlap with a Bluetooth piconet transmission.

Figure 4:
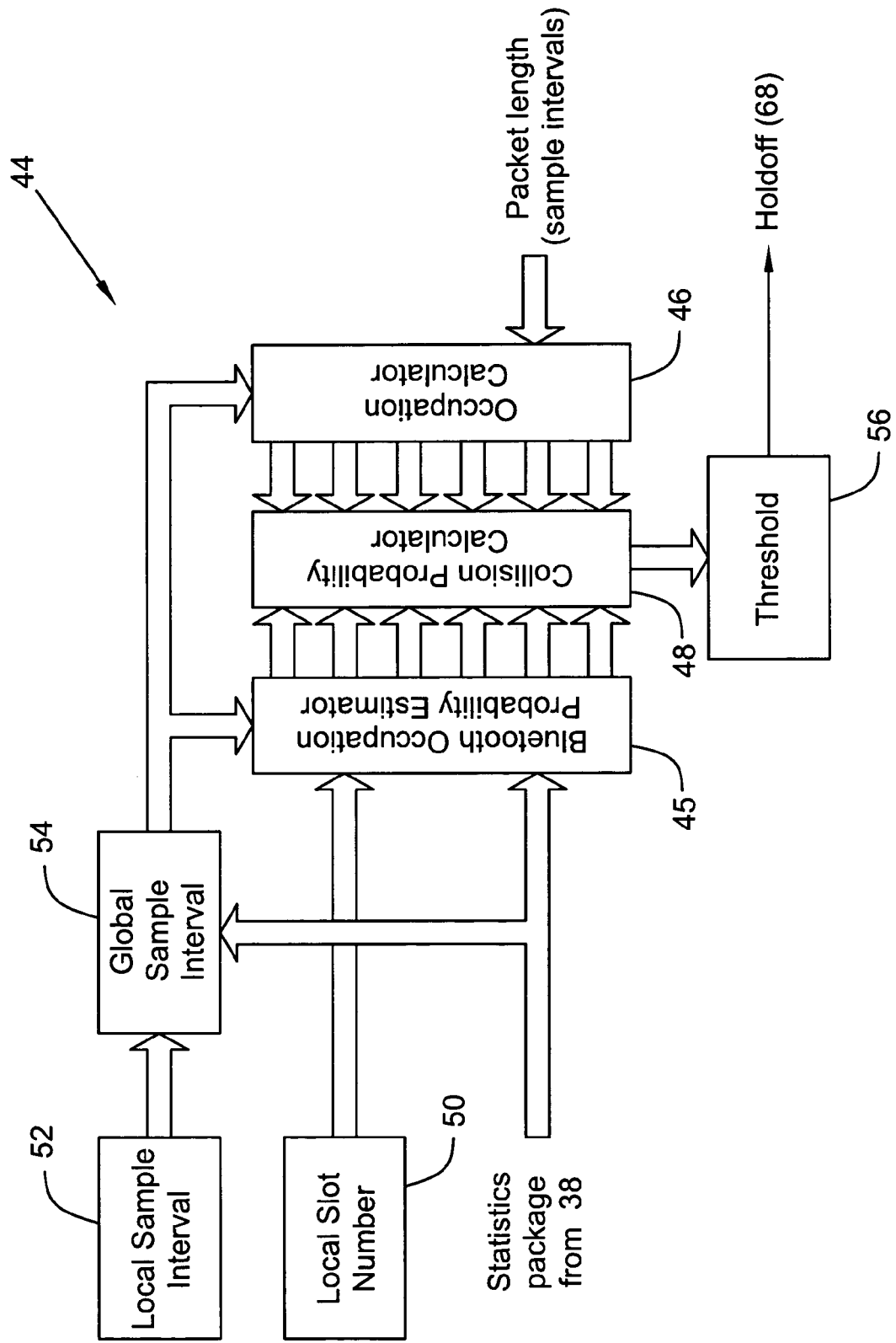
FIG. 4 is a block diagram for another component of the mitigation module shown in FIG. 1 in accordance with one embodiment of the present invention.

The estimator 44, shown in FIG. 4, expands the data contained in the statistics package 60. Based on a timer, the estimator 44 knows what time it is. The estimator 44 takes the statistics package (such as the package 60 in FIG. 5) including the time data received from the local sample interval unit 52 and the local slot number 50 and maps that data against the current time. The sample interval unit 52 supplies the sample interval information (e.g., 25 microseconds). The local slot number 50 may supply the slot interval (e.g., 625 microseconds). The global sample interval 54 aligns the statistics data to the correct time by calculating the time relative to the statistics package. Based on the current time, the probability estimator 44 determines the occupancy probability for the next six Bluetooth slots.

The probability estimator 45 provides the ability to predict what a Bluetooth piconet 11 will do in the future based on the statistic package 60 developed from analyzing the Bluetooth transmissions over a period of time. A collision probability calculator 48 receives the Bluetooth occupation probability estimation from the estimator 45 and the packet length for the packet intended to be transmitted by a node 10. This information may be provided in the transmit request 66. The wireless LAN node's intended transmit characteristics are expanded and compared over the next six slots and data for each slot is provided to the collision probability calculator 48. Thus, the calculator 48 receives slot by slot data from the occupation calculator 46 and slot by slot data from the estimator 45.

The output of the calculator 48 is provided to a threshold comparator 56. The comparator 56 compares the transmit request 66 to the estimated Bluetooth transmission probability indicated at 60 and determines whether to initiate a holdoff 68. The holdoff 68 moves the proposed transmission to a period of time of acceptably low collision probabilities.

Figure 6:
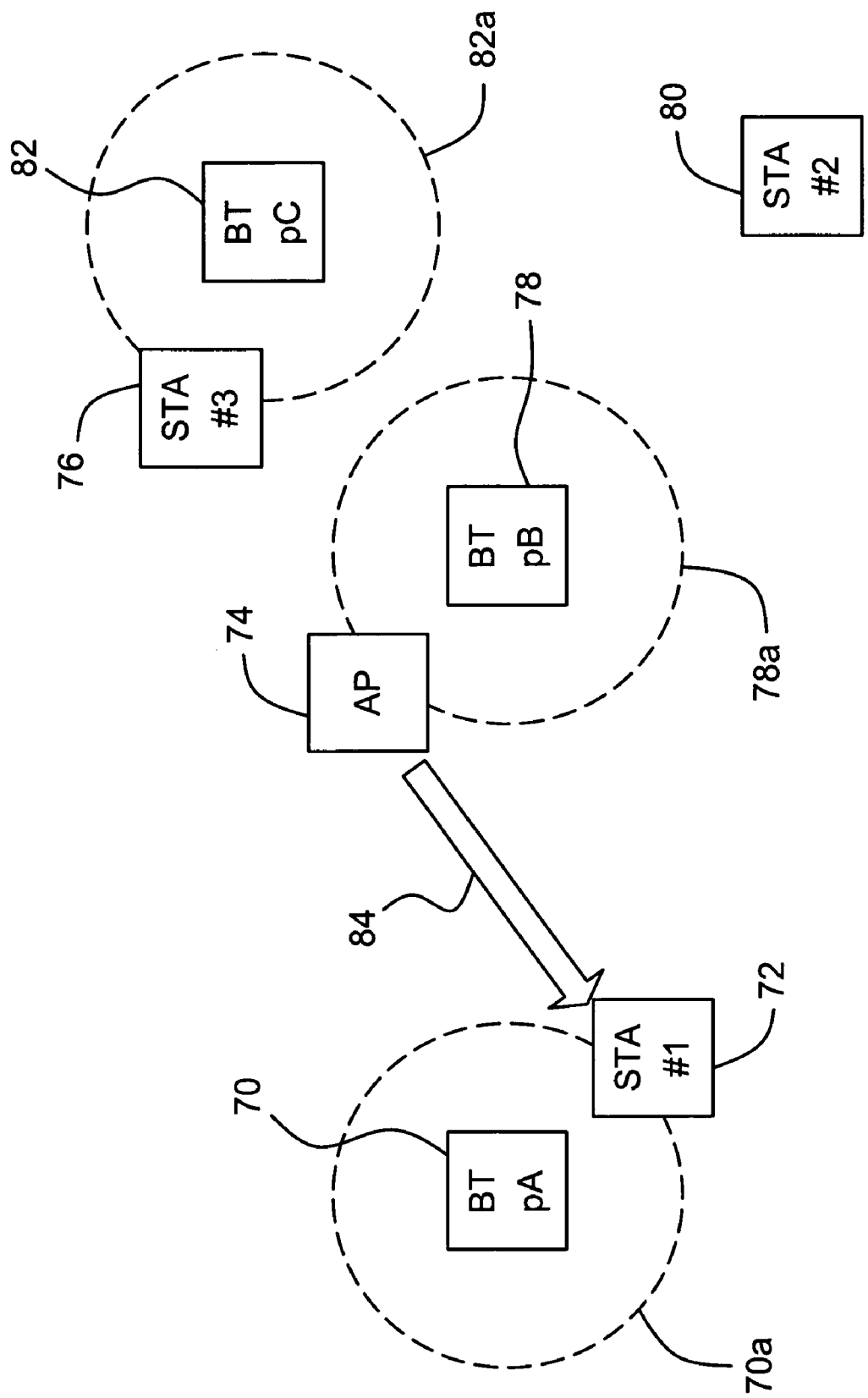
FIG. 6 is a schematic depiction of a wireless LAN network with proximate Bluetooth transmitters in accordance with one embodiment of the present invention.

A hypothetical local area network, shown in FIG. 6, may include a node or transceiver 72, a node or transceiver 80 and a node or transceiver 76. In addition, a Bluetooth/LAN transceiver or access point 74 may also be included in the network. An access point is a bridge connected on one side of one network and on the other side to another network for forwarding packets between the two networks. In addition to the wireless local area network including transceivers 72, 74, 76 and 80, a plurality of Bluetooth piconets 70, 78 and 82 may be proximate to one or more of the transceivers 72 through 80. For example, the piconet 70 may have a range 70a which encompasses the transceiver 72. Likewise, the piconet 78 may have a range 78a that encompasses the access point 74 and the piconet 82 may have a range 82a that encompasses the transceiver 76.

In this example, the Bluetooth piconets 70, 78 and 82 may operate in the same frequency band as the wireless LAN transceivers 72, 74 and 76. Thus, the possibility of interference exists between a locally proximate Bluetooth piconet such as the piconet 70 and the transceiver 72. In contrast, the transceiver 80, which is not proximate to any of the Bluetooth piconets, may not have any Bluetooth interference problems.

The access point 74 may transmit data to the transceiver 72 as indicated in 84. However, the access point 74 may be far enough away from the Bluetooth piconet 70 that the access point 74 may have no way to directly determine that its transmission may be interfered with by the Bluetooth piconet 70.

Instead, each transceiver 72, 74, 76 and 80 of the wireless LAN network does its own local evaluation of any potential interferers. Thus, the transceiver 72 analyzes the transmission from the Bluetooth piconet 70 within the range 70a and prepares a statistics package. The statistics package developed by the transceiver 72 and particularly by its unit 18, may then be transmitted to the access point 74. In one embodiment of the present invention, a relatively compact transmission such as the 32-bit word illustrated in FIG. 3, may be utilized.

Similarly, each node, such as the transceivers 72, 74, 76 and 80, transmits its statistics package information to all the other nodes in the wireless LAN network. As a result, any node wishing to transmit data to any other node can then take into account the local interference conditions with respect to the intended receiving station.

A transmitter, such as the access point 74, then uses a statistics package that it received from the transceiver 72 to time its transmission 84 to the transceiver 72. This is done through the collision probability estimator 44 local to the access point 74. More particularly, the statistics package may be generated by a unit 18 in the transceiver 72 and transmitted to all of the other network nodes. The collision probability estimator 44 in the access point 74 may use the statistics package from the transceiver 72 to make collision avoidance decisions and to control the timing of the transmission of data from the access point 74 to the transceiver 72.

Referring back to FIG. 1, the MAC 14 may include a processor 110 and a storage 112 that stores interference mitigation software 90, in accordance with one embodiment of the present invention. The software 90 may control the operation of the mitigation module 16 itself including the unit 18 and the estimator 44. In some embodiments of the present invention, that control may be implemented in software and in other embodiments, the control may be implemented in firmware or hardware. Similarly, the unit 18 and estimator 44 are illustrated as being implemented in hardware but in other embodiments, they may be implemented in software.

Figure 7:
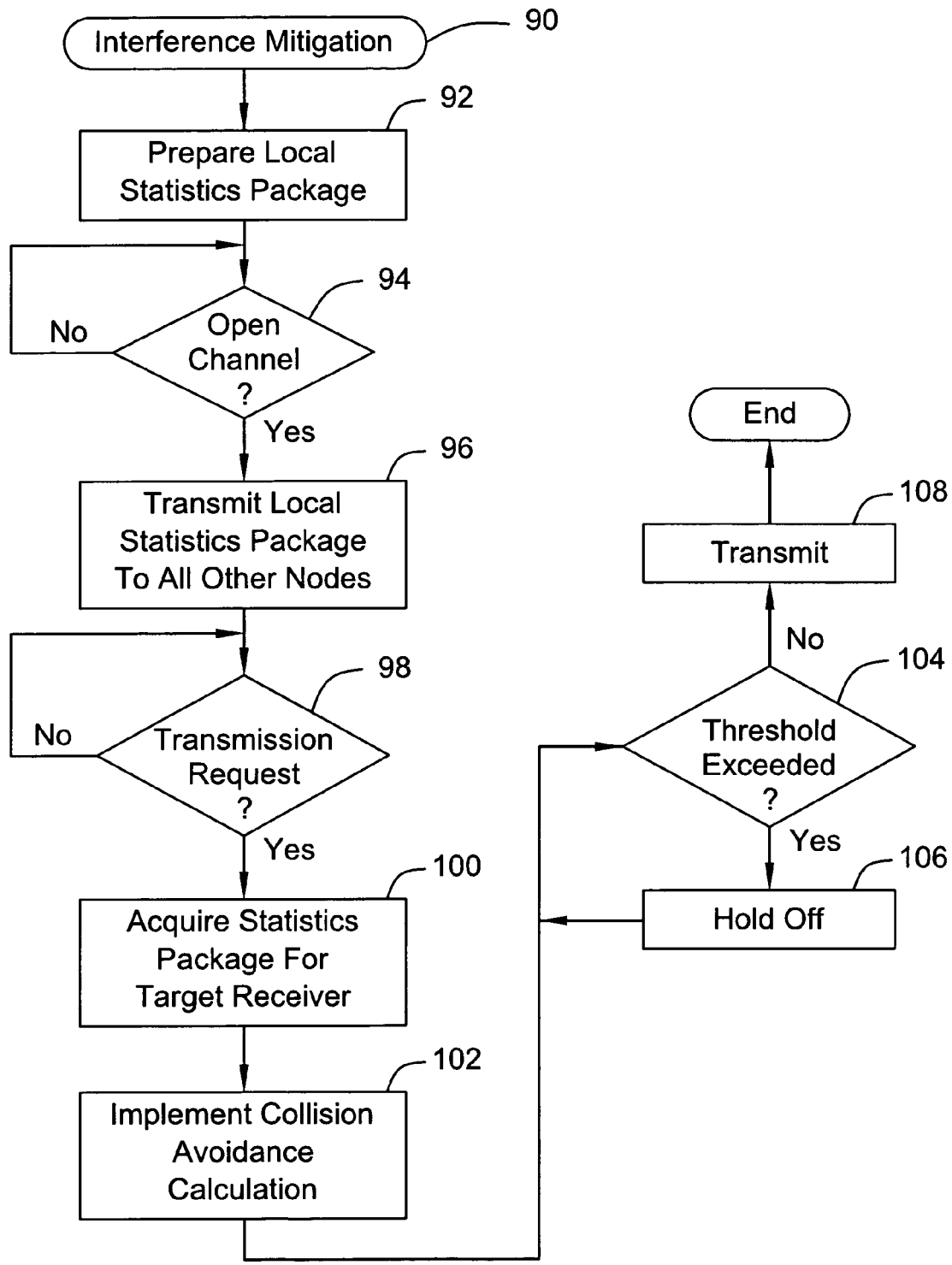
FIG. 7 is a flow chart for software in accordance with one embodiment of the present invention.

Referring to FIG. 7, the interference mitigation software 90 begins by preparing a local statistics package for any local Bluetooth piconet as indicated in block 92. The statistics package is prepared in the unit 18. A check at diamond 94 determines whether an open channel exists. If an open channel exists, wherein no ongoing transmissions or receptions are occurring in a particular node 10, that node may transmit its local statistics package to all the other nodes in a wireless LAN network as indicated in block 96.

When the transmission request is received at a node 10, as indicated in diamond 98, a statistics package that was previously received from the intended target receiver is acquired as indicated in block 100. The collision avoidance calculation is implemented as indicated in block 102 using the estimator 44 for example.

A check at diamond 104 determines whether the collision probability threshold probability is exceeded. If so, the transmission is heldoff as indicated in block 106. When the transmission threshold is no longer exceeded, as determined in diamond 104, the data is transmitted as indicated in 108.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a characteristic of a local noise source affecting a first transceiver, said characteristic sufficient to enable prediction of the future behavior of the noise source;
   determining the length of an intended transmission;
   using said characteristic and said length to predict a time period when the effect of the local noise source would be reduced for sufficient time for said intended transmission.

2. The method of claim 1 wherein determining a characteristic includes determining a characteristic of a local noise source at a first network node and using said characteristic to control a wireless transmission from a second network node to said first network node.

3. The method of claim 1 wherein using said characteristic includes determining a probability of a transmission occurring at a given time from said local noise source.

4. The method of claim 3 including delaying a transmission from a second transceiver to said first transceiver until the probability of interference with said local noise source is reduced.

5. The method of claim 1 wherein using said characteristic includes identifying a characteristic of said local noise source without demodulating said local noise source.

6. The method of claim 5 wherein using said characteristic includes identifying a periodicity in said noise source without demodulating said noise source.

7. The method of claim 1 including receiving a statistical model of said noise source to enable prediction of the future behavior of said noise source.

8. The method of claim 1 including identifying information about the transmission slots of said local noise source.

9. The method of claim 8 including determining the start point of a sequence of slots.

10. The method of claim 9 including determining whether a particular slot is used for transmitting information.

11. The method of claim 10 including using information about whether a slot is occupied to predict a time period of less noise from said noise source.

12. An article comprising a medium storing instructions that, if executed, enable a processor-based system to:
   determine a characteristic of a local noise source at a first transceiver, said characteristic sufficient to enable prediction of the future behavior of the noise source;
   determine the length of an intended transmission;
   use said characteristic of said noise source and said length to predict a time period when the effect of said local noise source on said first transceiver would be reduced for sufficient time for said intended transmission.

13. The article of claim 12 further storing instructions that enable the processor-based system to control a transmission from said second transceiver to reduce the probability of interference between said transmission and said local noise source.

14. The article of claim 12 further storing instructions that enable a processor-based system to transmit information about the probability of a transmission from said local noise source occurring at a given time.

15. The article of claim 12 further storing instructions to identify information about the transmission slots of said local noise source.

16. The article of claim 15 further storing instructions to determine the start point of a sequence of slots.

17. The article of claim 16 further storing instructions to determine whether a particular slot is used for transmitting information.

18. The method of claim 17 further storing instructions to use information about whether a slot is occupied to predict a time period of less noise from said noise source.

19. A transceiver comprising:
   a unit to process information about a noise source and the length of an intended transmission, said characteristic sufficient to enable prediction of the future behavior of the noise source to analyze said noise source and to predict a time period when the effect of said noise source would be reduced for sufficient time for said intended transmission.

20. The transceiver of claim 19 wherein said transceiver is a network node.

21. The transceiver of claim 19 including a received signal strength indication detector coupled to said unit.

22. The transceiver of claim 19, said unit to identify information about the transmission slots of said local noise source.

23. The transceiver of claim 22, said unit to determine the start point of a sequence of slots.

24. The transceiver of claim 23, said unit to determine whether a particular slot is used for transmitting information.

25. The transceiver of claim 24, said unit to use information about whether a slot is occupied to predict a time period of less noise from said noise source.

* * * * *